B. C. CALDERWOOD.
MACHINE FOR SEPARATING LEAF AND SEED COTTON.
APPLICATION FILED AUG. 30, 1911.
1,030,228.  Patented June 18, 1912.
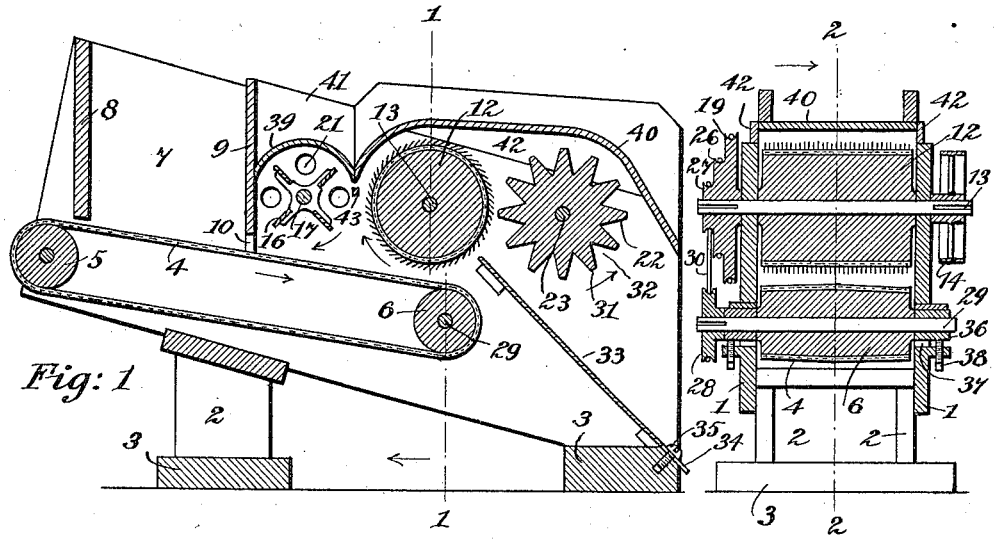
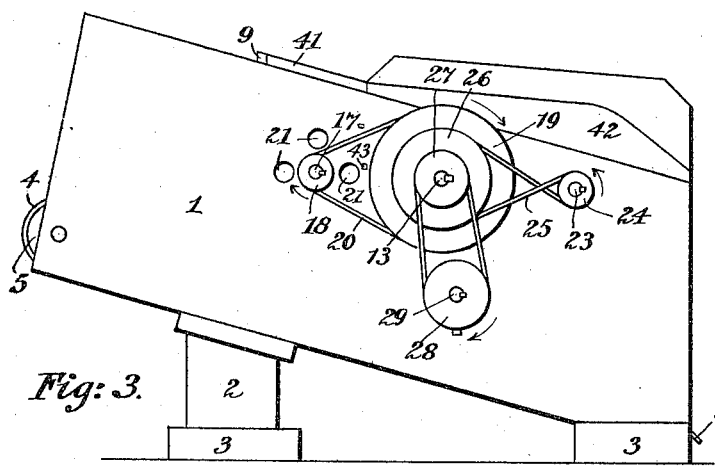
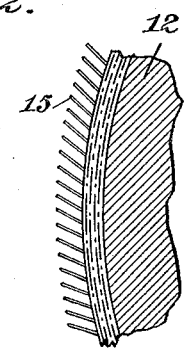
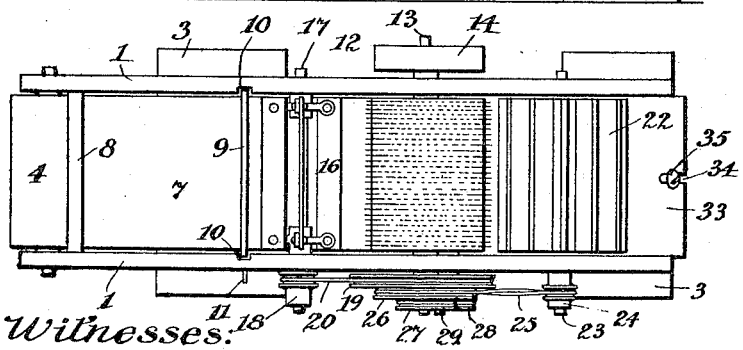
Witnesses:
F. E. Nares.
G. Blake.
Inventor:
Benjamin Crabtree Calderwood,
by his attorney,
Edward S. Beach.
COLUMBIA PLANOGRAPH CO., WASHINGTON, D. C.

UNITED STATES PATENT OFFICE.

BENJAMIN CRABTREE CALDERWOOD, OF VALLEY FALLS, RHODE ISLAND, ASSIGNOR TO PRICE-CAMPBELL COTTON PICKER CORPORATION, OF WILMINGTON, DELAWARE, A CORPORATION OF DELAWARE.

MACHINE FOR SEPARATING LEAF AND SEED COTTON.

1,030,228.  Specification of Letters Patent.  Patented June 18, 1912.

Application filed August 30, 1911. Serial No. 646,913.

*To all whom it may concern:*

Be it known that I, BENJAMIN CRABTREE CALDERWOOD, citizen of the United States, residing at Valley Falls, in the county of Providence and State of Rhode Island, have invented certain new and useful Improvements in Machines for Separating Leaf and Seed Cotton, of which the following is a specification, reference being had therein to the accompanying drawings.

My invention relates to the type of machines known as seed cotton cleaners, which have for their object the separation from the unginned or seed cotton of trash, leaves, dirt or other extraneous matter.

My invention relates specifically to the separation from seed cotton of green leaves, or leaves which are fresh or unwilted; for example, leaves which have been torn from the cotton plants in picking the cotton from them and which have not become dry, or crisp, or friable.

It has been found that these green leaves are very easily severed from the cotton plants under certain crop conditions during the harvest season. In gathering cotton from the cotton plants at such times, whether by hand or by the use of a cotton picking machine, a great many such green leaves will also be gathered and mixed with the cotton in the receptacle.

One object of my invention is to provide means for separating such green leaves from the seed cotton with which they have become mixed, such separation to be effected preferably immediately after the cotton has been gathered and while the leaves mixed with it are still fresh.

Another object of my invention is to provide means for feeding the cotton to the separating means.

Finally, the object of my invention is to provide a machine of the character described that will be strong, durable, efficient and simple, and comparatively inexpensive to construct, also one in which the several parts will not be likely to get out of working order.

With the above and other objects in view, the invention has relation to certain novel features of construction and operation, an example of which is described in the following specification and illustrated in the accompanying drawings:—

Figure 1 is a longitudinal section on line 2—2 of Fig. 2. Fig. 2 is a transverse section on lines 1—1 of Fig. 1. Fig. 3 is a side elevation showing the driving pulleys. Fig. 4 is a plan view with the covers removed from the interior mechanism; and Fig. 5 is an enlarged detail section showing the teeth of the carding roll.

Referring to the several views, in which like characters of reference indicate like parts, 1—1 constitute the main frames of my machine. They are supported on legs 2—2 and sills 3—3.

4 is a feed belt trained over pulleys 5 and 6. Above the rear end of said belt, and opening thereto, is a hopper 7 formed between the rear cross frame 8 and the partition 9. This latter is fitted to slide vertically in grooves 10—10 formed in the inner surfaces of the side frames 1—1, whereby it may be adjusted vertically to provide such opening as may be desired between its lower edge and the top surface of the belt 4. A pin 11, or other suitable means, may be provided to fix the partition 9 in its adjusted position.

12 is a card roller extending between the frames 1, 1 and mounted upon its shaft 13, whereby it is rotated. The shaft 13 is journaled in the side frames 1, 1 and has keyed to it pulley 14, which is rotated from a source of power not shown. The card roller 12 is provided over its whole peripheral surface with spines 15 projecting therefrom at an advancing angle, as shown in Figs. 1 and 5. This carding surface is preferably formed of a suitable carding-cloth attached to the surface of the roller 12.

16 is a fan extending across between the frames 1, 1 and mounted upon its shaft 17, which is journaled in the side frames 1, 1. A pulley 18, keyed to the fan shaft, has trained about it and about a pulley 19, keyed to the shaft 13, a belt 20 whereby said fan is driven. Holes 21 in the side frames 1, 1 admit air to the fan.

Both the card roll 12 and the fan 16 are located above the belt 4 and are at approximately the same level. In front of the card roll, and in close proximity thereto, and also approximately at the same level as the card roll, is located a doffer 22, mounted upon its shaft 23, which is journaled in the side frames 1, 1, and has keyed to it the pulley 24. A belt 25 is trained about the pulley and about a pulley 26 keyed to the card roll shaft 13, whereby the doffer is rotated. A pulley 27, also keyed to the shaft 13, drives a pulley 28 keyed to the shaft 29 through the belt 30. The shaft 29 is secured in the feed belt pulley 6, whereby the latter is driven from the card roll shaft 13.

The doffer 22 is provided with lengthwise ribs 31 between which are deep V-shaped grooves 32.

A separating plate or slide 33 extends diagonally downward and forward between the forward feed belt pulley 6 and the doffer 22, its upper edge being in close proximity to the card roll 12. This plate extends across the space between the side frames 1, 1 and forms a chute for the cotton from the card roll 12. This plate is preferably made adjustable toward or away from the card roll by means of the slotted opening 34 for the screw 35, permitting the plate to be adjusted and secured in the desired position in relation to the card roll.

The shaft 29 which carries the feed belt pulley 6 is journaled in vertically adjustable journal boxes 36 fitted to slide freely vertically in suitable openings 37 in the side frames. Screws 38 afford means for this vertical adjustment. By this means the belt 4 may be raised or lowered in relation to the card roll 12.

A removable curved cover plate 39 is fitted over the fan 16 to deflect the air current from the fan downward upon the belt 4.

A removable curved housing 40 is fitted above the card roller and doffer to prevent the cotton from being thrown from them, and to direct the air current produced by their rotation downward and forward.

Both the cover plate and the housing are flanged at 41 and 42 to rest upon the top edges of the side frames 1, 1.

43 is a bar extending crosswise of the machine and secured in the side frames 1, 1 at the rear of the fan 16, and in close proximity thereto. It is arranged to act in conjunction with the fan 16 as a breaker to break up burs, squares or stems and other particles of trash too large to pass between the card roller and conveyer. Such particles are drawn upward with the cotton, and are threshed or beaten between the breaker bar and the blades of the fan.

In operating my above described leaf separating device I attach the pulley 14 to a source of power to give the card roll 12, the fan 16, the doffer 22 and the feed belt pulley 6 rotation in the directions shown by the arrows in Figs. 1 and 3. Seed cotton mingled with leaves, when placed in the hopper 7 will be drawn forward by the feed belt 4 beneath the partition 9 in such quantity as the position of the said partition may determine. The feed belt is preferably inclined downward to facilitate the forward movement of the cotton and leaves. When the latter reach a point beneath the card roll 12, the spines of the latter seize and gather filaments of the cotton upon themselves, due to their rotation being opposed to the forward movement of the cotton upon the feed belt. The attachment of the cotton to the spines of the card roll is promoted by the advance inclination of the spine. The card roll is given a peripheral speed considerably in excess of the feed belt, whereby the cotton will be thinly and evenly distributed over the surface and the separation of the leaf from it facilitated. The distance between the feed belt and the points of the spines of the card roll is so adjusted as to permit the leaves to continue forward upon the feed belt as it passes under and beyond the card roll without being engaged by the spines. At the same time this distance is not sufficient to permit the cotton to pass beneath the card roll without being engaged sufficiently to be withdrawn thereby.

The rotation of the card roll in the direction shown in Fig. 1 produces a tangential air current, acting rearward and downward at the point of contact of the cotton with the card roll, and would have a tendency to roll the mixture of cotton and leaves backward upon the belt. It would also blow the leaves backward upon the belt after the cotton had been separated from them, causing them to rise from the belt and follow the cotton in the circuit about the card roll, thus defeating the purpose of the machine. To prevent this action of the fan 16 is provided. It is driven at a speed sufficient to produce a current of air much in excess of that produced by the card roll, and in an opposite direction from the latter, thus counteracting and overcoming it and producing a current between the card roll and the feed belt in the direction of travel of the latter. This downward and forward current of air from the fan acts to hold the cotton and leaves mingled therewith down upon the belt and against any tendency to rise therefrom. It also holds back cotton which is not properly attached to the card roll, permitting the latter to withdraw from the mixture nothing but the cotton. The forward current between the card roller and the belt carries the leaves forward against the rearward movement of the card roller and its adhering cotton. The cotton adhering to and carried around by the card roll is swept therefrom by the doffer 22. The doffer is driven at a speed greatly in excess of that of the card roll, and in a direction to remove the cotton from the spines, as shown. The seed cotton is received from the slide 33, from whence it may be taken to the cotton gin. The adjustment of the slide 33 in relation to the card roller is such as to prevent a strong rearward current of air from passing this point to interfere with the forward current over the belt 4. I preferably leave sufficient space between the points of the spines and the edge of the slide 33 to prevent injury to the former should seeds or other matter be drawn into said space. The slide is far enough forward of the feed belt pulley 6 to permit leaves to pass under it without interference. The fan-like form of the doffer, and its high speed, enables it to produce a rearward air current under the housing 40, in opposition to and greatly in excess of the forward current produced by the top of the card roll, thus tending to drive backward and downward any leaves which may have been lifted by the card roller.

By this device other extraneous matter, such as stems, hulls, dirt and trash, may also be removed from the cotton; the primary object, however, of my arrangement of the elements above set forth is the separation from the seed cotton of the fresh green leaf.

Modifications may be made in the arrangement of the parts without departing from the principles of their operation.

What I claim is:—

1. The combination, in a leaf and seed cotton separating machine, of a frame; a conveyer mounted in the frame; a fan mounted above and over the conveyer; a card roll mounted in the frame and rotatable in a direction opposite to the direction of rotation of the fan; and a doffer mounted in close proximity to the conveyer, the card roller being between the doffer and fan and an inclined discharge plate.

2. The combination, in leaf and seed cotton separating machine, of a frame; a conveyer mounted in the frame; a fan mounted above the conveyer; a card roll mounted in the frame; a transverse bar forming a trash-breaker and located between the fan and the card; a fan doffer parallel with the card; a housing for the fan, card roller and fan doffer and a separate plate.

3. In a leaf and seed cotton separating machine, a frame; a conveyer leading into the frame; a fan and card roll above the conveyer in combination with a housing over the card roll and fan doffer parallel therewith and adpacent thereto; and an inclined separating plate under the fan doffer.

In testimony whereof I affix my signature in presence of two witnesses.

BENJAMIN CRABTREE CALDERWOOD.

Witnesses:
THEO. H. PING,
JACOB S. RAPHAEL.

---

Copies of this patent may be obtained for five cents each, by addressing the "Commissioner of Patents, Washington, D. C."